Sept. 2, 1924.  
F. F. KESSEL ET AL  
CARRIER  
Filed Jan. 27, 1922

L. L. Scott  
F. F. Kessel INVENTORS

Victor J. Evans ATTORNEY

WITNESS:
Paul M. Hunt  
L. B. Middleton

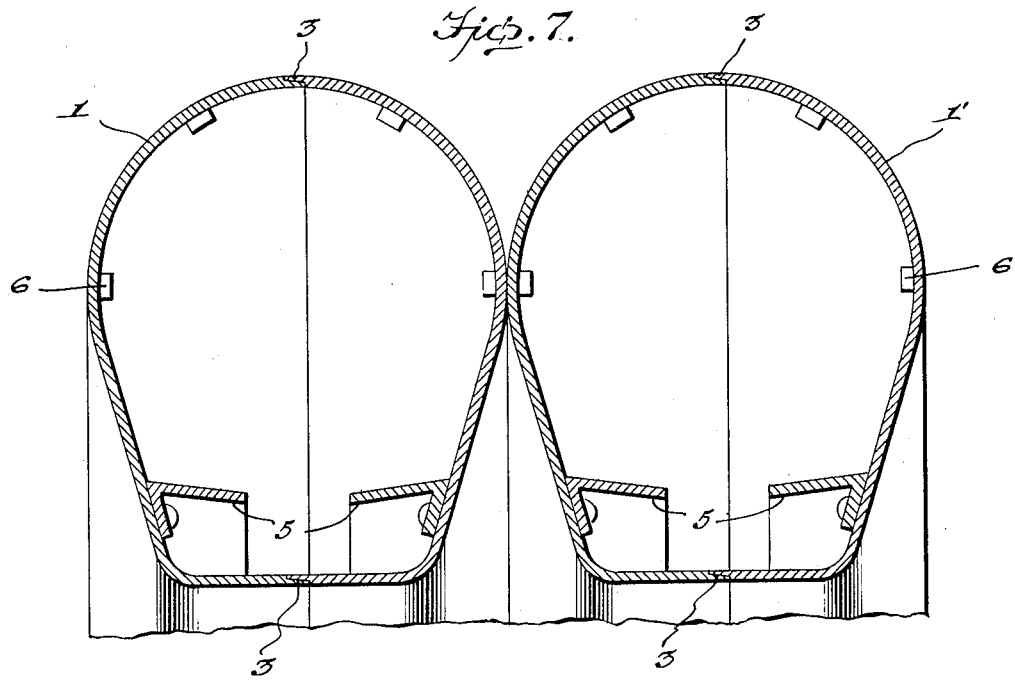
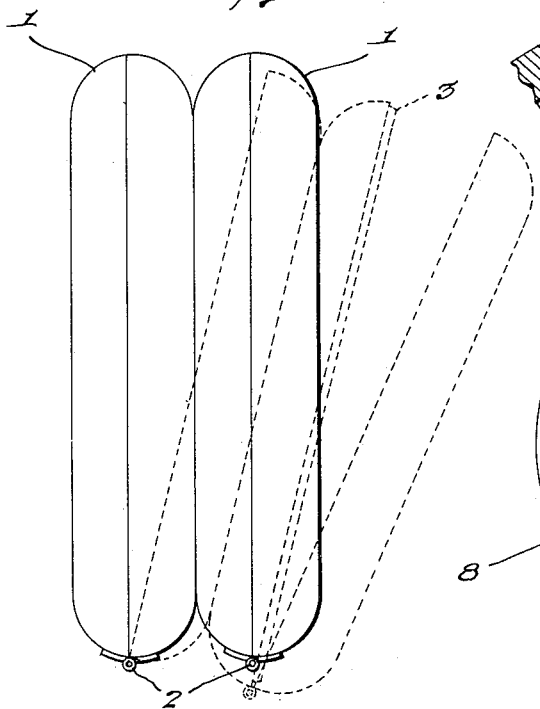
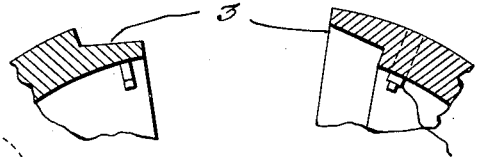
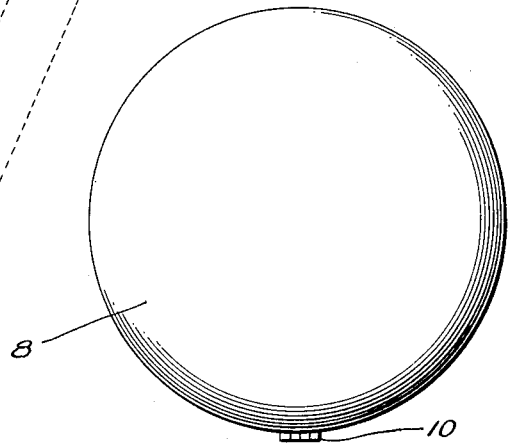

Sept. 2, 1924.
F. F. KESSEL ET AL
CARRIER
Filed Jan. 27, 1922
1,506,841
3 Sheets-Sheet 3
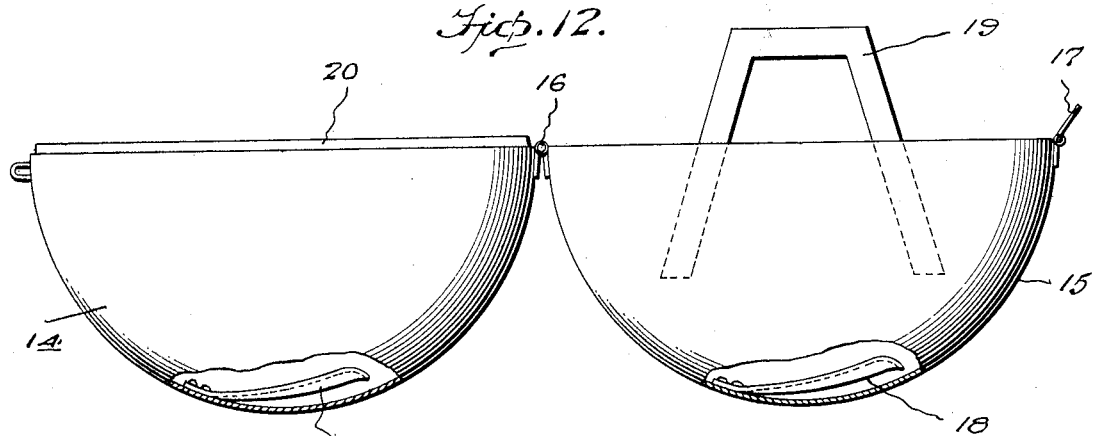
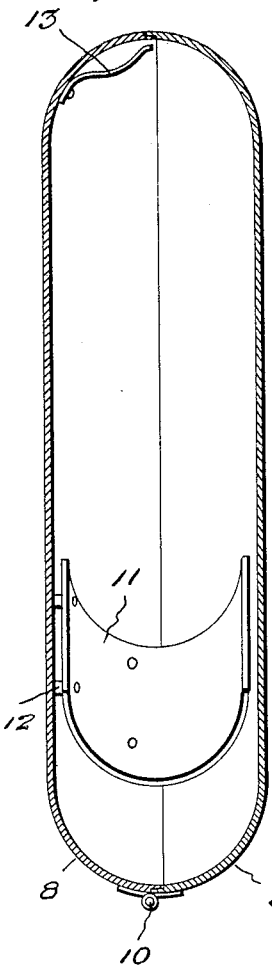
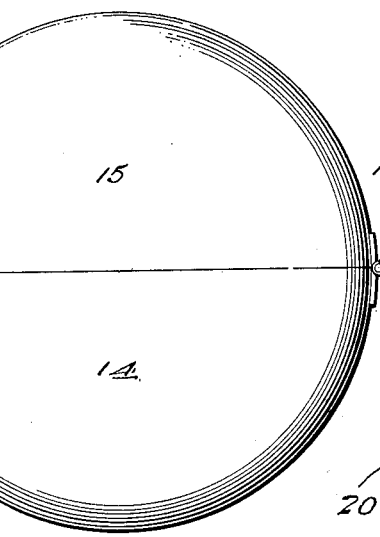
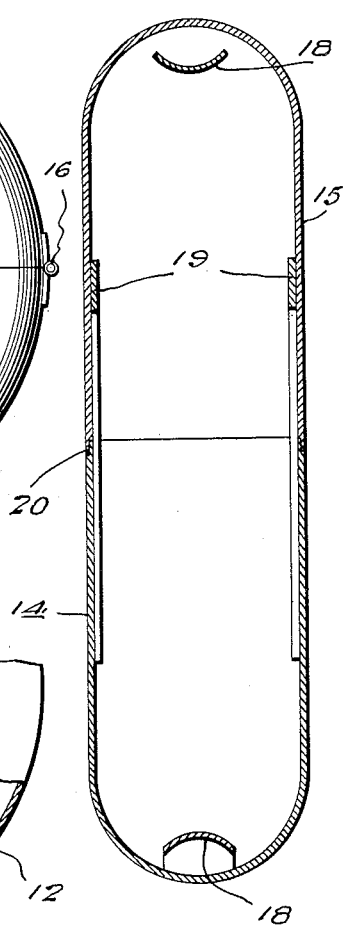
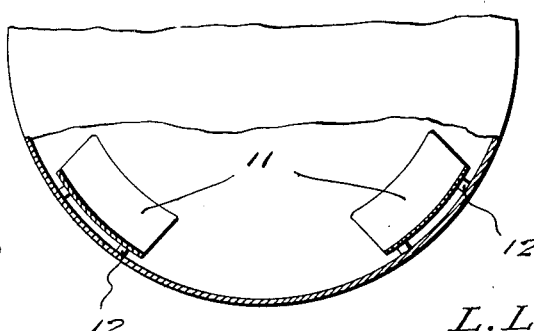
L. L. Scott
F. F. Kessel INVENTORS
BY Victor J. Evans ATTORNEY
WITNESS:

Patented Sept. 2, 1924.

1,506,841

UNITED STATES PATENT OFFICE.

FREDERICK F. KESSEL, OF MARINE CITY, MICHIGAN, AND LEONARD L. SCOTT, OF MARTINSBURG, WEST VIRGINIA.

CARRIER.

Application filed January 27, 1922. Serial No. 532,325.

*To all whom it may concern:*

Be it known that we, FREDERICK F. KESSEL and LEONARD L. SCOTT, citizens of the United States, residing at Marine City and Martinsburg, in the counties of St. Clair and Berkeley and State of Michigan and West Virginia, respectively, have invented new and useful Improvements in Carriers, of which the following is a specification.

This invention relates to a tire carrier for motor vehicles, the general object of the invention being to provide a closed case for receiving the tire so that it is thoroughly protected against the elements and against theft.

Another object of the invention is to form the case in sections which are hingedly connected together and which may be locked in close position.

A further object of the invention is to provide means for preventing movement of the tire or rim within the case.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figures 4 and 5 are detail views of the closing means.

Figures 6 and 7 are views of a double carrier.

Figures 8, 9 and 10 are views of a modified form of carrier.

Figures 11, 12 and 13 are views of another form of carrier.

Figure 1:
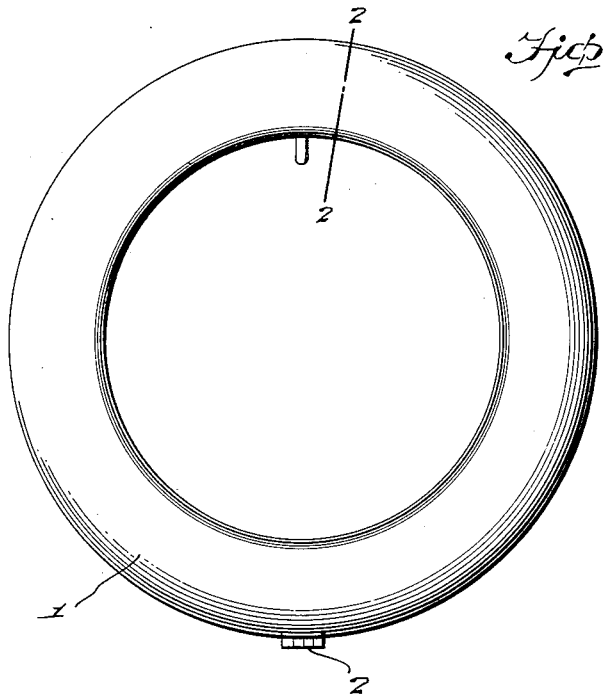
Figure 1 is a front view of a carrier constructed in accordance with our invention.
Figure 4:
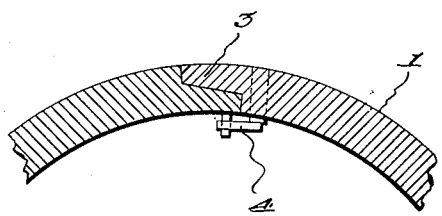
Figure 3:
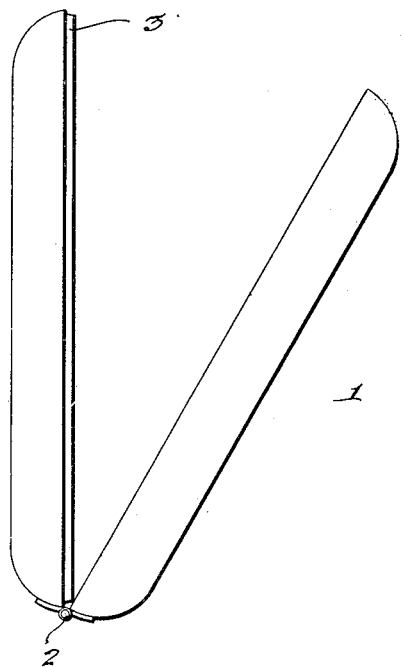
Figure 3 is an edge view showing the case in open position.
Figure 2:
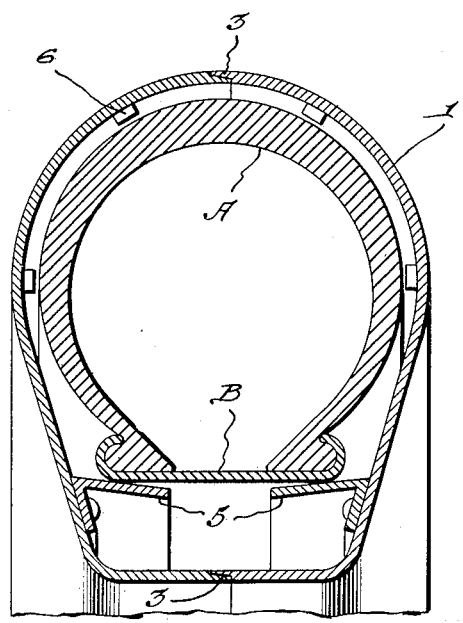
Figure 2 is a section on line 2—2 of Figure 1.

As shown in these views the carrier is made in the form of a circular case 1 which is adapted to receive the spare tire shown at A and its rim B therein. This case is formed of two sections which are hinged together, as at 2, so that one section can be moved away from the other section in order to permit the spare tire to be placed within the case or removed therefrom. The edges of the sections are provided with lap joints, as shown at 3, and suitable locking means 4 are provided for locking the two sections in closed position. Angle brackets 5 of annular shape are secured to each section, these brackets forming a rest for the rim, and they are so formed that they will firmly engage the rim and prevent the movement of the same in the case and thus eliminate rattling. Inwardly extending blocks 6 of resilient material are arranged in the case for engaging the tire to prevent movement of the same in the case.

Figures 6 and 7 show a pair of cases 1' and 1", each case being constructed as above described and one section of one case being connected with a section of the other case so that both cases can be opened and closed.

Figures 8, 9 and 10 show a modified form of carrier in which the case is made of circular form instead of ring form. These figures show the case as being formed of two sections 8 and 9 which are hinged together, as at 10. In the lower part of the case are located two trough shaped members 11 which are connected with the case by the legs 12. The tires are adapted to rest in these members and a leaf spring 13 is arranged in the upper part of one of the sections for engaging the upper part of the tire so that said tire is held against movement by the members 11 and said spring.

Figures 11, 12 and 13 show a case similar to that shown in Figures 8, 9 and 10 but in this case the case is divided diametrically instead of longitudinally. In these figures the two sections are shown at 14 and 15, the hinge at 16 and the latching means at 17. Each section is provided with a spring 18 for engaging the tire to hold the same against movement in the case. The section 15 of the case is provided with a pair of substantially U-shaped members 19 which are arranged to engage the other section, these members acting as guiding means and adding strength to the structure. The two sections are provided with lap joints, as shown at 20.

As will be seen the spare tire is thoroughly protected from the elements and from theft by our invention as it is entirely enclosed. The device can be used for carrying spare tires, either inflated or deflated, on the spare rim or it can carry a rim without a tire thereon. It can also be made to carry a demountable wheel.

It is thought from the foregoing description that the advantages and novel features of the invention will be readily apparent.

We desire it to be understood that we may make changes in the construction and in the combination and arrangement of the several parts, provided that such changes fall within the scope of the appended claim.

What we claim is:—

A tire carrier comprising a case for receiving the tire, said case being formed of two sections hingedly connected together, an annular supporting member secured to the side wall of each of said sections, said supporting members adapted to have their inner edges spaced apart when the sections of the casing are moved to closed position, said supporting members adapted to engage the inner periphery of a tire rim to support the same and a tire and have the tire valve disposed between their inner edges, and means secured to the inner side of the outer walls of the sections and acting to hold the rim in contact with the supporting means, and against movement relative thereto.

In testimony whereof we affix our signatures.

FREDERICK F. KESSEL.
LEONARD L. SCOTT.